United States Patent [19]

Davis, Jr. et al.

[11] 3,747,681

[45] July 24, 1973

[54] HYDRAULIC FRACTURING PROCESS USING POLYETHYLENE OXIDE BASED FRACTURING FLUID

[75] Inventors: John A. Davis, Jr.; John S. Rhudy, both of Littleton, Colo.

[73] Assignee: Marathon Oil Company, Findlay, Ohio

[22] Filed: May 26, 1972

[21] Appl. No.: 257,127

[52] U.S. Cl............. 166/307, 166/308, 252/8.55 R
[51] Int. Cl...................... E21b 43/26, E21b 43/27
[58] Field of Search................ 166/308, 307, 280; 137/13; 252/8.55 R

[56] References Cited
UNITED STATES PATENTS

| | | | |
|---|---|---|---|
| 3,023,760 | 3/1962 | Dever et al. | 137/13 |
| 3,075,581 | 1/1963 | Kern | 166/280 |
| 3,102,548 | 9/1963 | Smith et al. | 137/13 |
| 3,254,719 | 6/1966 | Root | 166/308 |
| 3,455,388 | 7/1969 | Huitt | 166/308 X |
| 3,458,442 | 7/1969 | Floyd et al. | 137/13 X |
| 3,483,121 | 12/1969 | Jordan | 166/308 X |
| 3,529,669 | 9/1970 | Tietz | 166/307 |
| 3,663,477 | 5/1972 | Ahearn | 166/308 X |

*Primary Examiner*—Stephen J. Novosad
*Attorney*—Joseph C. Herring, Jack L. Hummel et al.

[57] ABSTRACT

A formation is fractured by injecting at a pressure sufficient to fracture the formation an aqueous solution containing about 0.005 – 10 percent by weight of a high molecular weight (e.g., 50,000 to about 6,000,000) polyalkylene oxide polymer and about 0.005 – 10 percent by weight of a natural resin (e.g., calcium lignosulfonate). Such a solution is highly viscoelastic, i.e., fluid when not agitated, but exhibits a gel-like characteristic upon agitation.

12 Claims, No Drawings

HYDRAULIC FRACTURING PROCESS USING POLYETHYLENE OXIDE BASED FRACTURING FLUID

BACKGROUND OF THE INVENTION

1. Field of the Invention

This invention relates to fracturing subterranean reservoirs by injecting through an injection well in fluid communication with a subterranean stratum a fracturing fluid. The fracturing fluid is injected at a rate and pressure sufficient to fracture the subterranean strata. The fracturing fluid is a combination of a polyalkylene oxide polymer and a natural resin.

2. Description of the Prior Art

Hydrocarbon bearing subterranean formations often become contaminated with cement, drilling mud, foreign particles, emulsion blocks, etc. during normal operations. Such conditions adversely affect the production of hydrocarbon from the formation. Fracturing the formation is one way of overcoming these adversities to facilitate the movement of hydrocarbons to the well bore. In a hydraulic fracturing operation where high velocity is required, extremely high pressure drops are encountered resulting in the loss of a large amount of energy to pump or move the fluid. To overcome this problem, polymeric solutions have been developed to reduce friction loss in the fluid flow. U. S. Pat. No. 3,537,525 teaches the addition of a small amount of water soluble ecpylic acid acrylamide diacetone acrylamide terpolymer to reduce friction losses. U. S. Pat. No. 3,378,074 teaches the use of water and oil emulsions as fracturing agents and the use of a wetting agent to reduce friction between the injection string surface and fracturing agent.

The cross section area of the fracture is dependent, among other things, upon the apparent viscosity of the fracturing fluid as it enters and flows through the fracture, i.e., a viscous fluid is desired to obtain large fractures. Due to energy losses incurred in pumping highly viscous fluids, it is generally considered undesirable to pump such fluids. A further problem with such fluids is their tendency to plug the well because of their low mobility in porous media.

British Pat. No. 1,162,414 teaches a composition comprising an aqueous solution of an aromatic hydrocarbon sulfonic acid sulfonate and a polymer of ethylene oxide having a molecular weight of at least 50,000 with use as a fracturing agent.

U. S. Pat. No. 3,603,400 teaches fracturing with a micellar dispersion comprised of hydrocarbon, aqueous medium and surfactant. The viscosity of the dispersion is designed to obtain efficient fracturing.

Applicants have discovered that aqueous solutions containing polyalkylene oxide polymers and natural resins are very efficient fracturing fluids because of their high viscoelasticity properties.

SUMMARY OF THE INVENTION

Applicants have discovered a method of fracturing a formation by injecting an aqueous solution containing a high molecular weight polyalkylene oxide polymer and a natural resin. The solution's "gel-like" viscous nature when agitated makes it especially effective for fracturing the formation. After fracturing, the mixture can be readily removed from the fracturing sites since it is essentially fluid when not agitated.

DESCRIPTION OF THE INVENTION

The fracturing fluid is an aqueous solution containing a high molecular weight polyalkylene oxide polymer and a natural resin. The fracturing fluid is conventionally injected into the formation through an injection means such as an injection well or production well. A lubricating fluid such as a veneer of water can be used to wet the inner surface of the injection tubing to facilitate pumping. The fluid is injected at a rate sufficient to fracture the formation. The resulting fracture increases the permeability of the formation in the vicinity of the well bore. Propping agents may be incorporated in the fracturing fluid to hold open the fractures. Other agents such as corrosion inhibitors, emulsion breakers, scale inhibitors, etc. can be added to the fluid.

The term "polyalkylene oxide polymer" as used herein is meant to include high molecular weight polyethylene oxides, polypropylene oxides, and polybutylene oxides, etc. The molecular weight ranges can vary from about 50,000 to about 6,000,000 or more. Molecular weights of 10,000,000 or more may be desirable in specific applications.

The term "natural resin" as used herein is meant to include any unmodified resin (e.g., copal or a dammer) from a natural source (as a tree) or a modified resin from such source (i.e., tannic acid, all the lignosulfonates). Examples of natural resins useful in the above invention can be found on pp. 90–102, Vol. 12, *Encyclopedia of Polymer Science and Technology*, John Wiley and Sons., Inc., 1970.

Aqueous solutions containing a high molecular weight polyethylene oxide polymer and a natural resin (e.g., calcium lignosulfonate) are highly viscoelastic. Such solutions appear to be quite fluid when agitated gently. However, these solutions will set up to a gel-like material when agitated more rapidly. Standing for several minutes, the gel-like mass begins to revert to the more fluid form, ultimately reverting to the same character as that observed before agitation. These aqueous mixtures are classified as "shear thickening," i.e., they exhibit an increase in apparent viscosity with the shear rate.

The aqueous medium can be soft, brackish or brine water. Preferably the water is soft, but it can contain salts which are preferably characteristic of those within the subterranean formation being fractured. Where a highly viscous fluid is desired, it is preferred to use the soft water.

The concentration of polyalkylene oxide polymer in the aqueous solution is between about 0.005 percent and about 10 percent and preferably about 0.01 to about 1 percent, and most preferably about 0.1 to about 0.3 percent, the percents based on weight. Concentrations of the natural resin in the aqueous solution can range about 0.005 to about 10 percent and preferably about 0.025 to about 1 percent and most preferably about 0.2 to about 0.4 percent, the percents based on weight.

Concentrations of the various constituents of the fracturing fluid may be varied to produce gels having different viscosities. Such may be desirable to cope with the differing subterranean formation conditions.

The most preferred high molecular weight polyalkylene oxide polymer is a polyethylene oxide polymer (commercially available from Union Carbide Company, 270 Park Avenue, New York, N.Y. 10017, U.S.A., under the trademark Polyox). The most preferred natural resins are calcuim lignosulfonate and tannic acid. Adjusting the viscosity of the fracturing fluid is within the skill of those familiar with physical chemistry and the make-up of such aqueous mixtures.

Any of a number of commonly known propping agents may be incorporated within the fracturing fluid and injected into the formation. The higher the viscosity of the fracturing agent the greater its capcity to carry larger and heavier propping material. Preferred propping agents include coarse sand grains, tempered glass beads, rounded walnut shell fragments, aluminum pellets, and similar materials. Such agents can be used in concentrations of about 0.1 and about 5 pounds per gallon and preferably about 0.5 to 3.5 pounds per gallon of fracturing fluid. In general, propping agents with particle sizes of 6 mesh to about 400 mesh, more preferably 10 to about 100 and most perferably 10 to about 20 mesh are employed. Of course, particle size will depend upon the particular reservoir to be treated.

Additives such as oxidation and corrosion inhibitors, temporary blocking agents, diverting agents, etc. are also useful in the fracturing fluids. Any additive may be useful as long as it is compatible with the fracturing fluid and the reservoir.

The rates of injection should be sufficiently high to increase the pressure above the fracturing pressure or the overburden pressure. These rates will depend upon downhole pressure, permeability of the formation, width of the formation, etc.

Prefracturing agents may be injected into the reservoir to clean the reservoir rocks, etc. so that more efficient fracturing is obtained. Examples of such agents include acids, surfactant solutions,, etc. Also, diverting agents may be intermittently injected while fracturing the reservoir to obtain a more uniform fracturing profile — such are recommended in heterogeneous reservoirs containing highly permeable zones.

The fracture fluid may be followed by a strong mineral acid, e.g. hydrochloric or muratic acid, hydrofluoric acid and phosphoric acid, to stimulate the well after fracturing. Sodium hyopchlorite is also useful. Adversities from residual polymer, etc. can be overcome using these chemical agents. The following example illustrates specific working embodiments of the invention hydraulic fracturing fluids consisting of polyalkylene based mixtures.

EXAMPLE I

A core flood is carried out on a 1-inch diameter by 2 ¾-inch long Robinson sandstone core. The core is cleaned and dried prior to flooding. The core is flooded in the following sequence:
1. with water to determine initial permeability,
2. with polymer solution complex (4 pore volumes),
3. with water to determine flushed permeability,
4. with hypochlorite solution to remove residual polymer (0.5 pore volume), and then with
5. water to determine the second flushed permeability.

The polymer complex contains about 0.18 percent by weight polyethylene oxide polymer (with an average molecular weight of about 4,000,000) and 0.27 percent by weight calcium lignosulfonate. The solution has a 6 rpm Brookfield viscosity of 8.5 cps. at 25°C and a "screen factor" of 67.6 (screen factor as defined in American Institute of Mining, Metallurgical, and Petroleum Engineers, Inc. Paper Number SPE 2867, *Factors Influencing Mobility Control by Polymer Solution*, Copyright 1970). When the solution is agitated rapidly, it sets up as a gel. Pressure taps are placed into the core, dividing it into two segments, the first or upstream segment being 0.78 inches long and the second being 2.04 inches long.

Table 1 shows the results of the flood. After four pore volumes of the polymer complex had been injected, pressures had not stablized. There was a very low relative moibility across the front ¾ inch section (a decrease from water by a factor of amost 10,000) compared to a much smaller decrease in the second section (a factor of 4). This polymer fluid acts as a very effective plugging agent for a short distance giving very high differential pressures over the short distance. After the fluid flows for a short distance, its structure appears to break down and it becomes much more mobile. This is a most desirable property for a fracturing fluid since the fluid will not bleed off into the formation, due to its gel-like property. Data on the two sections of the core indicate that the gel-like structure breaks down as the fluid is forced through the formation. Once a fracture is open and the propping agent put in place, the fracturing fluid reverts to a water-like consistency and thus avoids permanent resistance to permeability.

The viscoelastic nature of the polymer complex decreases with time and shear. Injection of sodium hypochlorite is used to eliminate residual effects from the polymer complex. Data in Table 1 show the effects of injecting 0.5 pore volume of 2.7 percent sodium hypochlorite solution. The permeability of the second section is restored to 95 percent of its original value. Only the first three-fourths inches of the core shows any significant permeability reduction.

TABLE 1

| | Front Section Permeability | Relative Mobility | Rear Section Permeability | Relative Mobility |
|---|---|---|---|---|
| Initial Water | 95.9 md. | 1.0 | 102.3 md. | 1.0 |
| Polymer Complex (after 4 pore volumes) | | 0.000104 (at 1 ft/day) | | 0.256 (at 1 ft/day) |
| First Water Flush | 0.36 md. | 0.00376 | 38.8 md. | 0.379 |
| Hypochlorite Flush (0.5 pore volumes) | | | | |
| Second Water Flush | 26.0 md. | 0.272 | 97.3 md. | 0.952 |

The invention is not intended to be limited by the foregoing description, rather, all modifications and equivalents obvious to those skilled in the art are intended to be included within the scope of the invention as taught within the specification and appended claims.

What is claimed is:

1. A process of hydraulically fracturing a subterranean reservoir penetrated by at least one well, the process comprising injecting into the formation at a pressure sufficient to fracture the formation a viscous aqueous mixture comprised of about 0.005 to about 10 percent by weight of a high molecular weight polyalkylene oxide polymer and about 0.005 to about 10 percent by weight of a natural resin.

2. The process of claim 1 where the mixture contains about 0.01 to about 1 percent by weight of a polyethylene oxide polymer and about 0.025 to about 1 percent by weight of the natural resin.

3. The process of claim 1 wherein the natural resin is a lignosulfonate.

4. The process of claim 1 where the natural resin is tannic acid.

5. The process of claim 1 wherein a propping agent is incorporated into the viscous aqueous mixture.

6. The process of claim 1 wherein the polyalkylene oxide polymer has an average molecular weight above about 50,000.

7. The process of claim 1 wherein the average molecular weight of the polyalkylene oxide polymer is about 50,000 to about 6,000,000.

8. The process of claim 1 wherein the viscous aqueous mixture contains about 0.005 to about 10 percent by weight of a polyethylene oxide polymer and about 0.005 to about 10 percent by weight of a lignosulfonate.

9. The process of claim 1 wherein the viscous aqueous mixture contains about 0.05 to about 0.5 percent by weight of the high molecular weight polyalkylene oxide polymer and about 0.05 to about 0.5 percent by weight of the natural resin.

10. The process of claim 9 wherein the polyalkylene oxide polymer is a polyethylene oxide polymer and the natural resin is a lignosulfonate.

11. The process of claim 1 wherein an aqueous solution containing about 0.001 to about 50.0 percent by weight of sodium hypochlorite is injected into the formation after the formation is fractured.

12. The process of claim 1 wherein an aqueous solution containing a strong mineral acid is injected into the reservoir after it is fractured with the aqueous mixture.

* * * * *